(12) United States Patent
Palmroth et al.

(10) Patent No.: US 10,414,634 B2
(45) Date of Patent: Sep. 17, 2019

(54) METHOD AND SYSTEM FOR CONTROLLING THE CRANE OF A WORKING MACHINE BY USING BOOM TIP CONTROL

(71) Applicant: JOHN DEERE FORESTRY OY, Tampere (FI)

(72) Inventors: Mikko Palmroth, Tampere (FI); Simo Laitinen, Tampere (FI); Vesa Siltanen, Tampere (FI); Timo Käppi, Nokia (FI)

(73) Assignee: John Deere Forestry Oy, Tampere (FI)

( * ) Notice: Subject to any disclaimer, the term of this patent is extended or adjusted under 35 U.S.C. 154(b) by 646 days.

(21) Appl. No.: 14/761,602

(22) PCT Filed: Jan. 27, 2014

(86) PCT No.: PCT/FI2014/050063
§ 371 (c)(1),
(2) Date: Jul. 16, 2015

(87) PCT Pub. No.: WO2014/118430
PCT Pub. Date: Aug. 7, 2014

(65) Prior Publication Data
US 2015/0353328 A1 Dec. 10, 2015

(30) Foreign Application Priority Data
Jan. 29, 2013 (FI) .................................... 20135085

(51) Int. Cl.
*B66C 13/18* (2006.01)
*A01G 23/00* (2006.01)
(Continued)

(52) U.S. Cl.
CPC .............. *B66C 13/18* (2013.01); *A01G 23/00* (2013.01); *B66C 23/42* (2013.01); *E02F 3/437* (2013.01); *E02F 9/2033* (2013.01); *E02F 9/2214* (2013.01)

(58) Field of Classification Search
None
See application file for complete search history.

(56) References Cited

U.S. PATENT DOCUMENTS 4,752,012 A * 6/1988 Juergens ............... B66C 23/905
212/277
4,910,673 A * 3/1990 Narisawa ................... E02D 7/16
172/2

(Continued)

FOREIGN PATENT DOCUMENTS

CN 102345389 A 2/2012
DE 19810341 A1 9/1999
(Continued)

OTHER PUBLICATIONS

National Board of Patents and Registration of Finland, Office Action with English Summary for Finnish priority Application No. FI20135085 dated Sep. 16, 2015.
(Continued)

*Primary Examiner* — Navid Ziaeianmehdizadeh
(74) *Attorney, Agent, or Firm* — Klintworth & Rozenblat IP LLP (57) ABSTRACT

The disclosure relates to a method for controlling the crane of a working machine by using boom tip control, in which method the crane comprises at least two booms connected to the working machine and each other in an articulated manner, which booms are moved in relation to the working machine and to each other by means of actuators controlled by a control system of the working machine, and in which method the direction and speed of motion of the head of the
(Continued)

crane, controlled by the driver applying controls in the working machine, is implemented by applying speeds of the different booms of the crane. In the method according to the disclosure the speeds of different booms of the crane are determined automatically on the basis of at least one of the following factors: positions of the different booms of the crane in relation to the extreme position of their range of motion; the maximum speed of the head of the crane achieved by the crane; maximum force achieved by the crane; location of the head of the crane in relation to the working machine; location of surrounding obstacles in relation to the crane. The disclosure also relates to a system for controlling the head of the crane of a working machine by boom tip control.

18 Claims, 2 Drawing Sheets

(51) Int. Cl.
*B66C 23/42* (2006.01)
*E02F 3/43* (2006.01)
*E02F 9/20* (2006.01)
*E02F 9/22* (2006.01)

(56) References Cited

U.S. PATENT DOCUMENTS

| | | | |
|---|---|---|---|
| 5,312,217 A | 5/1994 | Lawrence et al. | |
| 5,424,623 A | 6/1995 | Allen et al. | |
| 5,446,981 A * | 9/1995 | Kamada | E02F 3/437 172/2 |
| 5,598,648 A * | 2/1997 | Moriya | E02F 3/437 37/348 |
| 5,823,218 A | 10/1998 | Schlecht et al. | |
| 5,835,874 A | 11/1998 | Hirata et al. | |
| 5,957,989 A * | 9/1999 | Egawa | E02F 9/2033 37/348 |
| 5,960,378 A * | 9/1999 | Watanabe | E02F 3/32 37/415 |
| 5,961,563 A * | 10/1999 | Overton | B66C 13/063 212/272 |
| 5,968,104 A * | 10/1999 | Egawa | E02F 3/435 37/414 |
| 6,098,322 A * | 8/2000 | Tozawa | E02F 3/437 37/414 |
| 6,405,114 B1 * | 6/2002 | Priestley | B66F 11/046 182/18 |
| 6,496,766 B1 * | 12/2002 | Bernold | B66C 15/065 212/276 |
| 7,975,410 B2 | 7/2011 | Faivre et al. | |
| 2001/0044789 A1 | 11/2001 | Widrow et al. | |
| 2002/0070870 A1 * | 6/2002 | Huang | B66C 15/045 340/685 |
| 2002/0073699 A1 * | 6/2002 | Nishimura | B66C 13/18 60/325 |
| 2004/0076502 A1 * | 4/2004 | Nissing | B66C 13/066 414/699 |
| 2008/0097672 A1 * | 4/2008 | Clark | E02F 3/434 701/50 |
| 2008/0275610 A1 * | 11/2008 | Terashima | B66C 13/063 701/50 |
| 2009/0008351 A1 * | 1/2009 | Schneider | B66C 13/063 212/272 |
| 2011/0006025 A1 * | 1/2011 | Schneider | B66C 13/063 212/273 |
| 2013/0161279 A1 * | 6/2013 | Schneider | B66C 13/06 212/273 |
| 2013/0213919 A1 * | 8/2013 | Kyllingstad | B66C 13/06 212/272 |
| 2013/0299440 A1 * | 11/2013 | Hermann | B66C 13/46 212/276 |
| 2013/0315699 A1 | 11/2013 | Matsuyama | |
| 2015/0130375 A1 * | 5/2015 | Sutherland | B66C 23/16 318/380 |

FOREIGN PATENT DOCUMENTS

| | | |
|---|---|---|
| EP | 0388 705 A2 | 10/1989 |
| EP | 0707118 A1 | 4/1996 |
| EP | 0979901 B1 | 2/2000 |
| EP | 2116128 | 5/2006 |
| EP | 1889537 | 7/2007 |
| FI | 7189 | 8/2006 |
| GB | 23471134 * | 12/2010 |
| JP | 02120427 A | 5/1990 |
| JP | 2006161465 A | 6/2006 |
| JP | 2012052687 A | 3/2012 |
| WO | 9102853 A1 | 3/1991 |
| WO | 0102280 | 1/2001 |
| WO | 2009043969 A1 | 4/2009 |
| WO | 2013007037 A1 | 1/2013 |
| WO | 2012127914 A1 | 7/2014 |

OTHER PUBLICATIONS

European Patent Office, Communication pursuant to Rule 114(2) EPC and Third Party Observation in European Patent Application No. 14746100.8-1655 dated Sep. 21, 2015.
Pedersen, et al., "Developing a Tool Point Control Scheme for a Hydraulic Crane Using Interactive Real-time Dynamic Simulation," Modeling, Identification and Control, vol. 31, No. 4, 2010, pp. 133-143, ISSN 1890-1328.
E. Rohmer, K. Yoshida, E. Nakano, A Novel Distributed Telerobotic System for Construction Machines Based on Modules Synchronization, IEEE/RSJ Int'l Conference on Intelligent Robots and Systems, Beijing Oct. 2006.
B. Löfgren, J. Wikander, "Kinematic Control of Redundant Knuckle Booms," International Journal of Forest Engineering, Jan. 1, 2009, pp. 22-30.
A. Hansson, M. Servin, Semi-Autonomous Shared Control of Large-Scale Manipulator Arms, Control Engineering Practice, Jun. 1, 2010.
G. Antonelli, S. Chiaverini, M. Palladino, G.P. Gerio, G. Renga, "Cartesian Space Motion Planning for Robots, An Industrial Implementation," IEEE, Jun. 20, 2004, pp. 279-284.
K. Prorok, "Crane-Tip Control of a Hydraulic Crane: A New Approach," Umeå Universitet, Dec. 2, 2003.
E. Papadopoulos, S. Sarkar, "On the Dynamic Modeling of an Articulated Electrohydraulic Forestry Machine," McGill University, Aug. 2, 1996.
U. Mettin, P. La Hera, D. Morales, A. Shiriaev, L. Freidovich, S. Westerberg, "Path-Constrained Trajectory Planning and Time-Independent Motion Control: Application to a Forestry Crane," International Conference on Advanced Robotics, Jun. 26, 2009.
U. Mettin, S. Westerberg, A. Shiriaev, P. La Hera, "Motion Analysis and Trajectory Replanning of Human-Operated Manipulators: Application to a Forestry Crane," International Conference on Intelligent Robots and Systems, Mar. 1, 2009.
B. Löfgren, "Kinematic Control of Redundant Knuckle Booms," Licensed Thesis, Dept. of Machine Design, Royal Institute of Technology, Jan. 23, 2004.
B. Löfgren, "Kinematic Control of Redundant Knuckle Booms With Automatic Path-Following Functions," Doctoral Thesis, Dept. of Machine Design, Royal Institute of Technology, Nov. 9, 2009.
A. Putkonen, "Crane Control of Walking Harvester," Master of Science Thesis, Tampere University of Technology, Nov. 1996, p. 95.
T. Conradsson, F. Jonsson, Report on Measurement Solutions for Angular Position of the Slewing and Rotator Applied to the Laboratory Crane and the Komatsu Fowarder 830, Aug. 11, 2007, Umeå Universitet, Sweden.

(56) References Cited

OTHER PUBLICATIONS

A. Heinze, "Modelling, Simulation and Control of a Hydraulic Crane," Sep. 1, 2007, Munich University of Applied Sciences.

M. Brander, D. Eriksson, B. B. Löfgren, "Automotation of Knuckleboom Work Can Increase Productivity," Skogforsk, May 1, 2004.

J. Thati, F. Noorbasha, "Crane Forwarder-Control Algorithm for Automatic Extension of Prismatic Link," e-Journal of Science & Technology, May 1, 2011, pp. 47-56.

U. Westerberg, I. Manchester, U. Mettin, P. La Hera, A. Shiriaev, Virtual Environment Teleoperation of a Hydraulic Forestry Crane, IEEE International Conference on Robotics and Automation, May 23, 2008.

P. Lawrencem S, S, Salcudean, N. Sepehri, D. Chan, S. Bachmann, N. Parker, M. Zhu, R. Frenette, Coordinated and Force-Feedback Control of Hydraulic Excavators, 4th Int'l Symposium on Experimental Robotics, Stanford, CA, Jul. 2, 1995.

Markus Saarela, Timber Cranes Coordinated Control, Master Thesis, Tampere University of Technology, Finland, Feb. 2005.

International Search Report and Written Opinion for related Finnish Application No. PCT/FI2014/050063, dated May 9, 2014.

National Board of Patents and Registration Office Action for related Finnish Application No. 20135085, dated Nov. 25, 2013.

European Search Report for Application/Patent No. 14746100.8-1705/2950631, PCT/FI2014050063, dated Oct. 7, 2016.

Finnish Patent and Registration Office, Office Action in Finnish Patent Application No. 20135085 dated Sep. 26, 2017.

Saarela M. et al. (2005); Coordinated Closed-Loop Motion Control of a Forest Log-Loader Boom, The Ninth Scandinavian International Conference on Fluid Power, SICFP-05, Jun. 1-3, 2005, Linkoping, Sweden.

Umeå University (2009) Smart Crane Control-Presentation and Demonstration of Results, Umeå University, Teknikhuset, Oct. 9, 2009.

Westerberg S. (2007); Virtual Environment for Teleoperation of Forwarder Crane, Umeå University Department of Computing Science, May 21, 2007.

Siciliano B. et al. (2010) Robotics—Modelling, Planning and Control, Advanced Textbooks in Control and Signal Processing, Springer-Verlag London Limited, 2010.

Siciliano B. et al. (2009) Robotics—Modelling, Planning and Control, Advanced Textbooks in Control and Signal Processing, Springer-Verlag London Limited, 2009.

Whitney D.E (1969) Resolved Motion Rate Control of Manipulators and Human Prostheses, IEEE Transactions on Man-Machine Systems, Jun. 1969.

Beiner L. et al. (1999); An Improved Pseudoinverse Solution for Redundant Hydraulic Manipulators, Robotica, vol. 17, pp. 173-179, Cambridge University Press, 1999.

Sciavicco et al. (1987); A Dynamic Solution to the Inverse Kinematic Problem for Redundant Manipulators, Department of Information and Systems, University of Napoli, 1987.

Printout of IEE Xplore Digital Library, A Dynamic Solution to the Inverse Kinematic Problem for Redundant, Manipulators, IEEE, Jan. 6, 2003.

Printout of Wayback Machine, http://www8.tfe.umu.se/personliga/kp/lic/iq4c.pdf, 2004-2005.

Printout of TIB Leibniz Information Centre for Science and Technology University Library, Conference Proceedings, SICFP-05, Jun. 1-3, 2005, Linkoping, Sweden.

* cited by examiner

METHOD AND SYSTEM FOR CONTROLLING THE CRANE OF A WORKING MACHINE BY USING BOOM TIP CONTROL

CROSS-REFERENCE TO RELATED APPLICATION(S)

This application is the U.S. national phase filing of PCT/FI2014/050063, filed Jan. 27, 2014, which claims priority to Finnish application No. 20135085, filed Jan. 29, 2013.

STATEMENT OF FEDERALLY SPONSORED RESEARCH OR DEVELOPMENT

Not applicable.

FIELD OF THE DISCLOSURE

The disclosure relates to a method for controlling the crane of a working machine by using boom tip control. The disclosure also relates to a system for controlling the crane of a working machine according to the method of the disclosure.

BACKGROUND OF THE DISCLOSURE

At present, a crane mounted on a working machine is in most cases still controlled by controlling the actuator provided in connection with each boom of the crane separately. As a result, the driver has to combine the movements of various actuators in order to make the crane move in a desired way. Normally, cranes are used for moving an implement fastened to the head of the crane. For example in a forest machine, the implement is a harvester head or a loading grapple, depending on whether the machine is a harvester or a forwarder. Largely depending on this are also the most typical movements that are usually implemented with the crane when working with the working machine. In a forwarder used for loading of timber, the crane is normally moved from the load space of the forwarder to the side of a log pile and back to the load space. When a harvester is used for felling of timber, the crane is normally moved in the horizontal direction from the working machine towards the trees to be felled and, after the felling, in a suitable direction where a pile of cut and delimbed tree trunks is placed. Normally, however, in all working machines, also other than forest machines, the aim of the movements of the crane is to move the implement at the head of the crane from one place to another. This may be the reason why a method has been recently developed for controlling the crane in a way that serves this aim better and thereby facilitates the work of the driver of the machine. In this so-called boom tip control (or coordinated control), the driver controls the crane in such a way that the control devices of the working machine are used for directly controlling the movement of the head of the crane in different directions of motion. Thus, a single control function of the control device is used for controlling the head of the crane to move e.g. in the horizontal direction away from the working machine and back towards the working machine, another control function is used for controlling the movement upwards and downwards in the vertical direction, and a third control function is used for controlling the turning of the whole crane to the left and to the right in the horizontal direction. For the driver, this so-called boom tip control is motorically less demanding, because when it is applied, the driver does not need to control the different actuators separately and to know how to combine the relationship between the movements of the single booms generated by them with the movements of the head of the crane, but this is performed automatically by the control system of the working machine according to the direction of motion where the driver wants the head of the crane to move. As a result, boom tip control has been found to make the work easier and more efficient, particularly for a driver with little experience. Such a method and apparatus for controlling the crane on the basis of boom tip control is described in the thesis by Markus Saarela, "Coordinated Motion Control of a Log Loader Boom".

Normally, the crane comprises two to three booms connected to each other and to the working machine in an articulated or otherwise movable manner. For example, the forest machines manufactured by the applicant typically comprise a hoisting boom connected at its first end in an articulated manner to a traverser mounted on the body of the working machine in a swiveled manner with respect to the vertical axis, a stick boom connected at its first end in an articulated manner to the second end of the hoisting boom, as well as an extension boom movable linearly out of the second end of the stick boom, in the longitudinal direction of the stick boom, and back into the stick boom. Now, if e.g. such a crane is controlled with boom tip control, the control system has, in principle, an infinite number of alternatives selectable for implementing a movement in a given direction of motion. Depending on where the head of the boom is moving with respect to its range of motion, some of these alternatives are always such that their implementation will lead to a situation in which the movement of the crane is more difficult than the implementation of another alternative, because of one or more factors limiting the movement of the booms of the crane. These limitations caused by the principle of operation of the crane are not taken into account in tip-control-based control methods of prior art; therefore, the cranes of prior art operated by boom tip control cannot always move the head of the crane in a desired way. This may mean, for example, that in a certain position the head of the crane will not move at all if an attempt is made to steer it in a direction whose implementation brings the control system to a situation in which it would have to move an actuator although this is, for example, in its extreme position, or in which a boom would hit the working machine, the ground, or another surrounding obstacle. In such a situation, the driver has to move the crane first in a suitable direction, in which the boom tip control can move the crane, to be able to continue the work.

SUMMARY OF THE DISCLOSURE

It is an aim of the disclosure to provide a method for controlling the crane of the working machine by boom tip control in such a way that the movement of the crane is not stopped or the movement of the head of the crane is not prevented or complicated even in situations, in which the head of the crane is steered in such a range, in which one or some of the actuators moving the crane are in the extreme positions of their ranges, or in which the location of the head of the crane or the location of known surrounding obstacles is such that they prevent the movement, in the desired direction, of the head of the crane within its range of motion or by using the movements of certain booms. Furthermore, it is an aim of the disclosure to present a system functioning according to the method of the disclosure, for controlling the crane of a working machine.

The aim of the disclosure is achieved by a method and a system, in which the control system in a working machine, controlling the movements of the head of the crane of the working machine, is programmed to operate in such a way that it selects the speeds of motion of the different booms of the crane on the basis of predetermined factors in such a way that the desired direction and speed of motion of the head of the crane is implemented by using speeds of motion of the different booms of the crane which are suitable for the situation, or that a direction of motion of the head of the crane which is not possible at a given point or within a given range is automatically replaced with a suitable direction of motion close to said direction of motion, in which case the driver does not need to perform the necessary change in the direction of motion manually because the crane is not capable of moving in said direction of motion or the movement is slower than normal.

To put it more precisely, the method according to the disclosure may provide a method for controlling the crane of the working machine by using boom tip control. The crane may have at least two booms connected to the working machine and to each other in an articulated manner, which booms are moved in relation to the working machine and each other by means of actuators controlled by a control system of the working machine. The direction and speed of motion of a head of the crane, controlled by controls in the working machine, are achieved by applying speeds of the different booms of the crane. The speeds of the different booms of the crane are determined automatically on the basis of at least one of the following factors: positions of the different booms of the crane in relation to an extreme position of their range of motion; a maximum speed of the head of the crane achieved by the crane; maximum force achieved by the crane; a location of the head of the crane in relation to the working machine; and a location of surrounding obstacles in relation to the crane. A system for controlling a crane of a working machine by boom tip control may have a control element for controlling the crane according to the above method.

The method and the system according to the disclosure have the advantage that when using boom tip control according to the disclosure, it is faster and easier to control the crane of the working machine, because the movement of the head of the crane is not prevented or complicated even if a boom of the crane is in the extreme end of its range of motion, or if a boom is in a position from which it cannot move further in a direction required for the movement of the head of the crane in the desired direction because of an obstacle or for another reason, or if the head of the crane is moving in a direction which would lead to e.g. a risk of collision. Thanks to this, the driver does not need to make extra movements manually in order to avoid these situations, whereby the operation of the crane becomes easier and faster with respect to the boom tip control implemented in the way of prior art.

According to a first aspect of the method according to the disclosure, when the boom of the crane comes closer to the extreme end of its range of motion than a predetermined distance, its speed of motion is limited.

According to a second aspect of the method according to the disclosure, when the position of at least one boom comes closer to the extreme end of its range of motion than a predetermined distance, the speed of motion of at least one other boom is increased.

According to a third aspect of the method according to the disclosure, the share of the movement of booms that implement the movement of the head of the crane at the highest possible speed is weighted.

According to a fourth aspect of the method according to the disclosure, the share of the movement of booms that implement the movement of the head of the crane with the lowest possible energy consumption is weighted.

According to a fifth aspect of the method according to the disclosure, the share of the boom implementing the movement of the head of the crane with the highest possible force on generating the movement is weighted.

According to a sixth aspect of the method according to the disclosure, the direction of motion of the head of the crane is automatically changed from the direction of motion steered by the driver so that the direction of motion of the head of the crane will deviate from the target of the driver.

According to a seventh aspect of the method according to the disclosure, if the movement of the head of the crane controlled by the driver cannot be implemented, the head of the crane will be controlled to move in a direction deviating from this.

According to an eighth aspect of the method according to the disclosure, if the driver steers the head of the crane towards the working machine in the horizontal direction, the head of the crane will be automatically lifted to a predetermined minimum height during the movement.

According to a ninth aspect of the method according to the disclosure, if the driver steers the head of the crane closer to a minimum distance from the working machine in the vertical direction, the head of the crane will be simultaneously moved away from the working machine during this movement.

According to a tenth aspect of the method according to the disclosure, if the driver steers the head of the crane upwards within an at least predetermined maximum distance, the head of the crane will be simultaneously moved in the direction of the working machine.

According to an eleventh aspect of the method according to the disclosure, the working machine is a forest machine equipped with a load space, and the crane comprises a hoisting boom connected at its first end in an articulated manner to the working machine, a stick boom connected at its first end in an articulated manner to the second end of the hoisting boom, and an extension boom connected to the stick boom at its second end and movable linearly outwards and inwards in the longitudinal direction of the stick boom.

According to a twelfth aspect of the method according to the disclosure, the speed of motion of the extension boom is limited when the head of the crane is within the load space.

According to a thirteenth aspect of the method according to the disclosure, the speed of motion of the extension boom is limited when the head of the crane is at a predetermined distance from the load space.

According to a fourteenth aspect of the method according to the disclosure, the boom tip control is switched off in one or some of the following ways when the head of the crane is within a given area or reaches a given area by its movement: automatically, by a control function to be generated by a separate control device, or by maintaining a control function for controlling another function for a predetermined time.

According to a fifteenth aspect of the method according to the disclosure, the boom tip control is automatically switched on again when the head of the crane moves out of a given area.

According to a sixteenth aspect of the system according to the disclosure, the control system of the working machine comprises a data processing unit for controlling the movements of the crane by programmable software in the data processing unit, and the control element is software stored in the data processing unit.

BRIEF DESCRIPTION OF THE DRAWINGS

In the following, the disclosure will be described in more detail with reference to the appended drawings, in which.

DETAILED DESCRIPTION

The method and the system according to the disclosure can be applied in a variety of working machines equipped with a crane, for example in various excavators and forest machines. In forest machines, the method can be well utilized in, for example, forwarders 10 such as that shown in FIG. 1, and harvesters 44 such as that shown in FIG. 3. Most typically, the actuators used for moving different booms of a crane in a working machine are hydraulic cylinders, but in principle they could also be other actuators with linear movements, such as pneumatic cylinders or spindle motors. Furthermore, for moving e.g. a traverser that rotates the crane horizontally, it is also possible to apply actuators generating a rotary motion, such as hydraulic or electric motors. For controlling all these actuators, however, it is possible to use a control system equipped with a programmable data processing unit and controlling the movements of the crane by means of control functions generated by control devices placed in the cabin of the working machine in such a way that that the control system converts a given control function into a control command for generating a desired movement of one or some actuators in the working machine.

Figure 1:
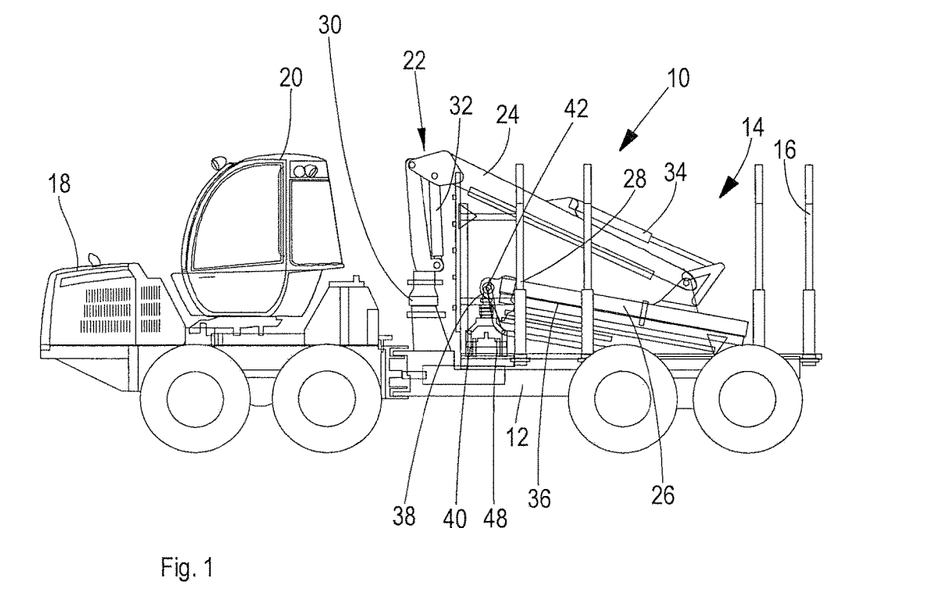
FIG. 1 shows a forwarder whose crane is controlled by a method according to the disclosure.
Figure 2:
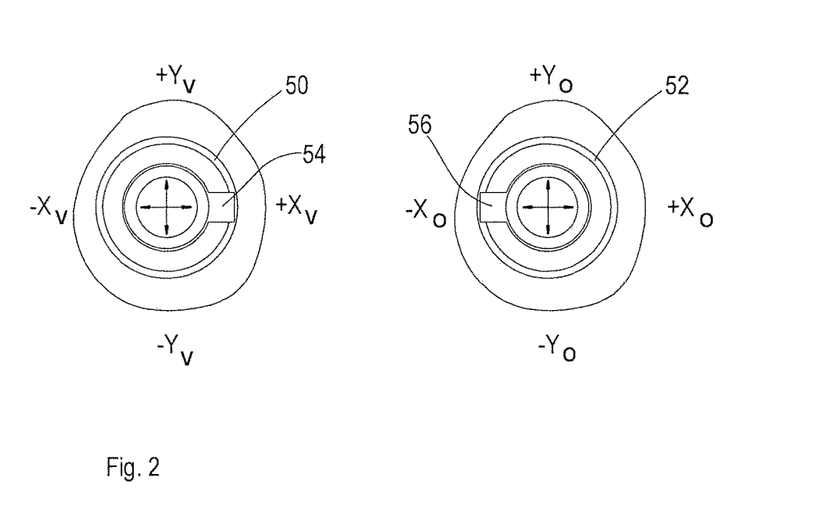
FIG. 2 shows a principle view of control levers in the cabin of a forwarder according to FIG. 1, and control functions to be generated by them for controlling the crane of the forwarder according to FIG. 1.

The forest machine shown in FIG. 1 is a forwarder 10 intended for hauling felled tree trunks out of the forest. The rear part of the body 12 of the forwarder 10 is provided with a load space 14 formed for the transportation of the tree trunks in a space between bunks 16. The front part of the forwarder 10 is provided with a driving motor 18 and a cabin 20, with its steering and control equipment. Among other things, the control levers for the left and the right hand, shown in FIG. 2, are provided within the cabin. In this forwarder 10, the crane 22 intended for the manipulation of tree trunks is provided between the cabin 20 and the load space 14. The crane 22 consists of a hoisting boom 24, a stick boom 26, and an extension boom 28. The crane 22 is mounted on the body 12 of the forwarder by means of a traverser 30 that is rotatable about a vertical axis with respect to the same in such a way that it can be rotated about the forwarder 10, from the left to the right and vice versa in lateral direction with respect to the body 12. The hoisting boom 24 is connected at its first end in an articulated manner to the traverser, to be turnable with respect to a horizontal axis. The stick boom 26 is connected in an articulated manner to the second end of the hoisting boom 24, and the extension boom 28 is arranged at the end of the stick boom to be movable in its longitudinal direction in such a way that it is movable from the end of the stick boom by its range of motion out of the end of the stick boom and back into the stick boom 26. Between the hoisting boom 24 and the traverser 30, between the hoisting boom 24 and the stick boom 26, and between the stick boom 26 and the extension boom 28, actuators 32, 34 and 36 are provided which operate in a way known as such, for example hydraulically, and by which the hoisting boom 24 can be turned with respect to the traverser 30, the stick boom 36 can be turned with respect to the hoisting boom 24, and the extension boom 28 can be moved outwards from the stick boom 22 and back inwards.

At the head 38 of the crane 22, a loading grapple 40 is provided, equipped with gripping members 48 known as such, which are turned towards or away from each other by an actuator provided in them, wherein the loading grapple 40 can be used for gripping one or more tree trunks for hauling them to a desired location. The loading grapple 40 can also be rotated by a rotating device 42 provided therein, so that the trunks in the loading grapple 40 can be brought to a suitable position when they are e.g. loaded into or unloaded from the loading space 14.

The control of the forwarder 10, the crane 22 and the loading grapple 40 is configured to be performed from the cabin 30 placed in the front part of the body 12. For this, the cabin 30 is provided with various control devices known as such, for example the control lever 50 for the left hand and the control lever 52 for the right hand as shown in FIG. 2, as well as rocker levers 54 and 56 provided in these for controlling e.g. the movement of the crane 22 and the opening and closing of the gripping members of the loading grapple 40 with control functions generated by these controls. During the control, the control commands generated by the control functions given with the control lever 50 for the left hand and the control lever 52 for the right hand are transferred from these controls by communication buses to a data processing unit located in the control system and actually taking care of the control of the actuators 32, 34 and 36 for generating the functions of the crane 22 as well as the actuator controlling the opening of the loading grapple, and the rotating device 42, by means of electro-hydraulic control valves in their hydraulic circuits.

Figure 3:
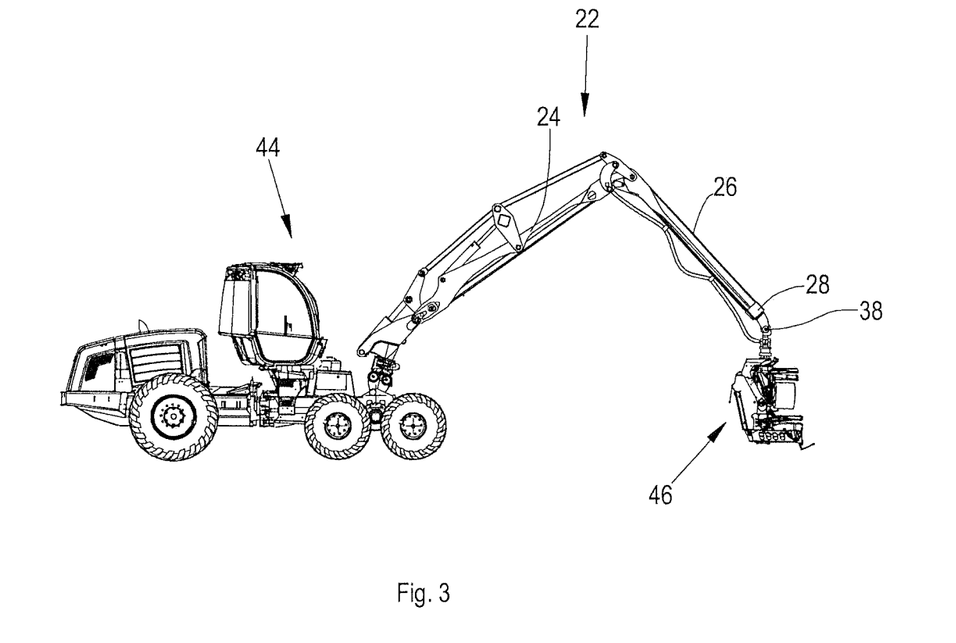
FIG. 3 shows a harvester whose crane is controlled by a method according to the disclosure.

FIG. 3 shows a harvester 44 equipped with a corresponding crane. Here, the control of the crane 22 is implemented in a similar way but for the control of the harvester unit 46, more control functions have to be generated by various control devices. Some of these may be implemented by means of control devices separate from the control lever 50 for the left hand and the control lever 52 for the right hand shown in FIG. 2. However, these do not need to be presented in more detail in this context, because the subject of interest is merely the control of the crane 22 which is implemented in the same way in the forest machines shown in FIGS. 1 and 3.

Boom tip control is applied for controlling the crane 22 in the forwarder 10 according to FIG. 1 and in the harvester 44 according to FIG. 3. Consequently, when the crane 22 is controlled with control devices in the cabin, particularly the control lever 50 for the left hand and the control lever 52 for the right hand can be applied for determining the desired direction of motion of the head 38 of the crane. For implementing this, software has been programmed in the data processing unit of the control system to calculate the speeds of motion needed for the actuators 32, 34 and 36 moving the different booms, by applying kinematic equations in such a way that the desired direction and speed of motion of the head 38 of the crane are achieved as well as possible. In this context, however, there is no need to present the kinematic equations and control engineering required by the boom tip control, because solutions of prior art can be applied in that respect. Consequently, in the method according to the disclosure, the calculation of the kinematics of the crane can be implemented, for example, in a way presented in the thesis by Markus Saarela, that is, for example on the basis of Denavit-Hartenberg notation. Solutions of control engineering may also be known as such, because they can be used for controlling the crane in a programmed way, that is, for example by using control commands (in other words, control currents to be input in control valves) based on the above mentioned kinematic calculations.

In the method according to the disclosure, the factors (i.e. criteria) applied are implemented in the boom tip control of the crane 22 in the forwarder 10 of FIG. 1 and in the harvester of FIG. 3 in such a way that when a given criterion is met, the desired direction of motion of the head 38 of the crane, or the way of putting it into action (i.e. the booms by which the movement is implemented) is changed according to the criteria. In other words, the automatic correcting functions modify the control command for controlling a given boom or given booms 24, 26, 28 of the crane 22, and/or the way in which the speeds of motion of the single booms, obtained as a result of calculation, are determined for the different booms. This is performed by software in the data processing unit of the control system of the working machine on the basis of the location of the head 38 of the crane and the positions of the different booms 24, 26, 28 of the crane 22 with respect to each other.

In the forwarder 10 of FIG. 1 and in the harvester of FIG. 3, the control of the crane 22 by boom tip control is executed with control devices 50 and 52 of FIG. 2, in a normal situation in the following way (that is, when the control system does not modify the control commands to be generated with the different control functions): When the control lever 50 for the left hand is turned in the direction +Yv, the head 38 of the crane will move away from the working machine in the horizontal direction. In a corresponding manner, when the control lever 50 for the left hand is turned in the direction −Yv, the head 38 of the crane will move towards the working machine in the horizontal direction. When the same lever is turned to the side in the direction +Xv, the head 38 of the crane will move to the right in the lateral direction, and when the lever is turned in the direction −Xv, the head 38 of the crane will move to the left in the lateral direction. When the control lever 52 for the right hand is moved in the direction +Yo, the head 38 of the crane will move upwards in the vertical direction, and when it is moved in the direction −Yo, the head 38 of the crane will move downwards. By implementing these control functions simultaneously in a suitable way, the driver of the working machine can make the loading grapple or harvester head fastened to the head 38 of the crane move in a desired direction at a desired speed. For example, for moving the head of the crane obliquely away from the working machine and to the left, the driver of the working machine will turn the left control lever obliquely to the left and forward (that is, in a direction between the directions +Yv and +Xv). In a normal situation, the speed of the movement of the head 38 of the crane is directly proportional to how much the control lever is turned in the direction of the control function for generating said movement. However, the crane controlled according to the method of the disclosure will move precisely in the way controlled by the driver only if there is no obstacle for moving the head of the crane in said direction of motion controlled by the driver. Furthermore, in the method according to the disclosure, the segmentation of the movement of the head of the crane among the single booms, that is, for example in the case of the crane 22 of FIG. 1, between the hoisting boom 24, the stick boom 26 and the extension boom 28, is automatically adjusted on the basis of certain factors (criteria) depending on the position and location of the crane 22.

In the following, programmable changes to be made in the movements of the crane in the forwarder 10 of FIG. 1 and in the harvester of FIG. 3 will be presented by way of example.

If any movement of a boom of the crane 22 approaches its end limit (which is typically caused by the limitedness of the range of motion of the actuator for moving the same), its speed is started to reduce well in advance (at a given distance from the end limit of said movement). This distance will depend on the structure of the crane and the lengths of the booms. Furthermore, the deceleration may take place gradually in a ramp-like manner. When the speed of one boom is decreased, the speed of motion of the other boom is increased respectively so that the direction and speed of motion of the head of the crane, desired by the driver, are achieved. The increase in the speed of the other booms/one other boom may take place in a ramp-like manner similar to the deceleration of the boom approaching its end limit. This feature is effective for all booms of the crane 22, that is, the hoisting boom 24, the stick boom 26 and the extension boom 28.

A more precise example is a situation, in which a loading grapple 50 is brought from a long distance closer to the machine. At first, all the booms are in use, that is, the hoisting boom 24, the stick boom 26 and the extension boom 28. When the extension boom 28 comes close to its end limit, to a certain limit distance from it, its movement is gradually decelerated. To keep the speed of the head 38 of the crane 22 constant, the speeds of the hoisting boom 24 and the stick boom 26 are increased correspondingly. After the extension boom 28 has been totally withdrawn into the stick boom 26, the movement is continued merely with the hoisting boom 24 and the stick boom 26.

Normally, the desired speed of motion of the head 38 of the crane can be achieved by a large variety of speed combinations of different booms. In these cases, it is possible to select various weightings for the application of the different booms 24, 26 and 28 and thereby the actuators 32, 34 and 36 for moving these. Factors on the selection of the weightings may include, for example, the maximum speed of motion of the head 38 of the crane, the smooth application of the boom, the relative strengths of the actuators 32, 34 and 36, and the need to keep the crane 22 in an advantageous position for the next movements. With respect to these, the software programmed in the control system comprises basic rules which apply in very different situations.

For example, in the harvester 44 of FIG. 3, prioritizations of the movements of different booms (i.e. different actuators) to be implemented include the following:

1. The extension boom 28 is to be withdrawn into the stick boom 26 as fast as possible when the head 38 of the crane is moved towards the machine.

2. When the head 38 of the crane is farther than a predetermined maximum limit distance from the machine, it is to be lowered by applying the hoisting boom 24, and the lowering movement performed by the stick boom 26 is limited.

3. When the head 38 of the crane is farther than a predetermined maximum limit distance, the head 38 of the crane is to be hoisted by applying the hoisting boom 24 so that the hoisting movement performed by the stick boom 24 is limited correspondingly.

In some situations, the limits of movement of the actuators 32, 34 and 36 moving the crane 22, and the geometry of the crane 22, prevent the head 38 of the crane from moving in the desired direction. In these cases, a direction of motion is to be sought for the head 38 of the crane, which direction does not deviate too much from the desired direction of motion and which will result in the crane 22 circumventing the obstacle to the movement. This is implemented so that when deviating from the desired direction of movement, the head 38 of the crane is controlled to move more slowly than usual (that is, than the normal speed of motion corresponding to this speed of motion). Also, the transition between these two modes is implemented smoothly. As an example, a situation can be mentioned in which the head 38 of the crane is controlled to move upwards in the vicinity of a column. First, the head 38 of the crane can be moved directly upwards, but when the extension boom 38 is totally withdrawn in the stick boom 26, a linear motion upwards will be impossible. The aim is to correct this situation by applying the hoisting boom 24 or the stick boom 26. The resulting path of motion will deviate from the desired one, but the crane 22 will not stop and the "deadlock" situation will be passed.

In boom tip control, the driver of the machine determines the direction of motion of the head 38 of the crane. In the control of the head 38 of the crane according to the method of the disclosure, however, the control system can intervene by changing this direction of motion controlled by a control device, if this is expedient. For example in the harvester of FIG. 3, changes in the direction of motion are made in the following situations:

1. When a tree trunk is brought closer to the machine in the vicinity of the ground, the head 38 of the crane is automatically lifted to the level of the wheel. As a result, the tree trunk possibly held by the harvester head will be brought to the optimal height for processing.

2. If the head 38 of the crane is lifted upwards closer to the machine than a defined minimum limit distance, its path of motion is changed to extend slightly outwards. In this way, the risk of collision with the machine is reduced.

3. If the head 38 of the crane is lifted when farther than a defined maximum limit distance from the machine, it can be simultaneously brought closer to the machine (unless a known obstacle for moving the head of the crane is located in this area). In this way, a shorter lever arm is achieved for hoisting a load.

The way of controlling the boom can also be changed on the basis of a work stage. As an example, we can present the control of the crane 22 of the forwarder 10 according to FIG. 1 when trunks are unloaded from the load space 14 of the forwarder 10.

1. Within the load space 14, the extension boom 28 is not moved outwards at all, or only very slowly.

2. When the driver has selected a separate unloading mode, the extension boom 28 is not moved either when the head 38 of the crane is close, i.e. closer than a given safety distance, to the machine.

Also, in many other situations, the movement of the different booms 24, 26 and 28 can be limited according to the need. For example, if any boom of the crane 22 were moving to a difficult position in view of the surrounding known obstacles, the movement of such boom can be limited and compensated by other booms.

The boom tip control according to the method of the disclosure can also function so that it is switched off automatically, by a separate control device, or by maintaining a control function controlling another function for at least or not longer than a predetermined time when this function is in a given condition and the head of the crane is within a given area or reaches a given area by its movement. For example in the forwarder 10 of FIG. 1, such a function could be the control function for withdrawing the extension boom into the stick boom when the extension boom is already placed completely inside the stick boom and the loading grapple is e.g. close to (within a predetermined maximum distance from) the screen of the load space. Furthermore, the boom tip control according to the method of the disclosure can be configured to function so that it is automatically switched on again when the head of the crane moves out of a given area.

In the above presented example embodiments, the method according to the disclosure can be used in cranes implemented in different ways from the crane 22 shown. In the case of more than three booms, the number of various alternatives for providing a given direction and speed of motion increases. On the other hand, if the number of booms connected to each other is smaller than three (e.g. in the case of an excavator), e.g. a linear motion cannot always be implemented, and the aim of the control can thus be to move the head of the crane by applying the closest possible direction of motion to be implemented. Functions according to the method of the disclosure, affecting the direction of motion or the way of implementation of the head of the crane or the single booms, and programmed in the control system of the machine, may also be other than those presented in the examples above. In some cases, the determining factor could be, for example, the lowest possible energy consumption (e.g. when the loading grapple of the forwarder is empty when it is moved) or the greatest possible force (when it is known that the trunk in the loading grapple is very heavy) that can be achieved with the boom in connection with said movement. In view of efficient work, it is important that the head of the crane and the implement therein is brought to the desired location as soon as possible. Thus, the software in the control system can operate so that it implements most of the movement with the boom that makes the head of the crane move as fast as possible in the easiest way. This can also be performed in such a way that the implementation of the exact direction of the motion is compromised during the movement but at the end of the movement, the head of the crane is, in any case, in the location to which the driver has steered it. This can be implemented, for example, in such a way that the software calculates the theoretical realized path of motion from the different positions of the control lever, and after that (in practice, at the moment of stopping), the head of the crane is moved by the deviation between the real location and the calculated location, after which the head of the crane is, after the movement has ended, exactly in the location intended by the driver of the machine.

Thus, the method and the system according to the disclosure should not be restricted to the example embodiments presented above, but they may vary within the scope of the appended claims.

What is claimed is:

1. A method for controlling a crane of a working machine by using boom tip control, in which method the crane comprises at least two booms connected to the working machine and to each other in an articulated manner, which booms are moved in relation to the working machine and each other by means of actuators controlled by a control system of the working machine, and in which method the direction and speed of motion of a head of the crane, controlled by controls in the working machine, are achieved by applying speeds of the different booms of the crane, wherein the speeds of different booms of the crane are determined automatically on the basis of at least one of the following factors: positions of the different booms of the crane in relation to an extreme position of a range of motion of each of the booms; a maximum speed of the head of the crane achieved by the crane; and a maximum force achieved by the crane.

2. The method according to claim 1, wherein a speed of motion of a boom of the crane is limited when the boom comes closer than a predetermined distance to the extreme position of its range of motion.

3. The method according to claim 1, wherein a speed of motion of at least one of the booms is increased when a position of at least one other of the booms comes closer than a predetermined distance to the extreme position of its range of motion.

4. The method according to claim 1, wherein a share of movement of the booms implementing movement of the head of the crane is weighted at a highest possible speed.

5. The method according to claim 1, wherein a share of a movement of the booms implementing movement of the head of the crane is weighted with a lowest possible energy consumption.

6. The method according to claim 1, wherein a share of the boom implementing movement of the head of the crane is weighted with a highest possible force, on generating the movement of the head.

7. The method according to claim 1, wherein a direction of motion of the head of the crane is changed automatically from a direction of motion steered by a driver so that the direction of motion of the head of the crane deviates from a target of the driver.

8. The method according to claim 7, wherein if the movement of the head of the crane controlled by the driver cannot be implemented, the head of the crane is controlled to move in a direction deviating from the movement of the head of the crane controlled by the driver.

9. The method according to claim 7, wherein if the driver steers the head of the crane towards the working machine in a horizontal direction, the controls of the working machine control the actuators of the booms to automatically lift the head of the crane to a predetermined minimum height.

10. A method for controlling a crane of a working machine by using boom tip control, in which method the crane comprises at least two booms connected to the working machine and to each other in an articulated manner, which booms are moved in relation to the working machine and each other by means of actuators controlled by a control system of the working machine, and in which method the direction and speed of motion of a head of the crane, controlled by controls in the working machine, are achieved by applying speeds of the different booms of the crane, wherein the speeds of different booms of the crane are determined automatically on the basis of at least one of the following factors: positions of the different booms of the crane in relation to an extreme position of their range of motion; a maximum speed of the head of the crane achieved by the crane; a maximum force achieved by the crane; a location of the head of the crane in relation to the working machine; and a location of surrounding obstacles in relation to the crane, wherein if the driver steers the head of the crane closer to a minimum distance from the working machine in a vertical direction, the head of the crane is simultaneously moved away from the working machine.

11. A method for controlling a crane of a working machine by using boom tip control, in which method the crane comprises at least two booms connected to the working machine and to each other in an articulated manner, which booms are moved in relation to the working machine and each other by means of actuators controlled by a control system of the working machine, and in which method the direction and speed of motion of a head of the crane, controlled by controls in the working machine, are achieved by applying speeds of the different booms of the crane, wherein the speeds of different booms of the crane are determined automatically on the basis of at least one of the following factors: positions of the different booms of the crane in relation to an extreme position of their range of motion; a maximum speed of the head of the crane achieved by the crane; a maximum force achieved by the crane; a location of the head of the crane in relation to the working machine; and a location of surrounding obstacles in relation to the crane, wherein if the driver steers the head of the crane upwards within an at least predetermined maximum distance, the head of the crane is simultaneously moved in the direction of the working machine.

12. The method according to claim 1, wherein the working machine is a forest machine equipped with a load space, and wherein the crane comprises a hoisting boom connected at its first end in an articulated manner to the working machine, a stick boom connected at its first end in an articulated manner to a second end of the hoisting boom, and an extension boom connected to the stick boom at its second end and movable linearly outwards and inwards in a longitudinal direction of the stick boom.

13. The method according to claim 12, wherein a speed of motion of the extension boom is limited when the head of the crane is within the load space.

14. The method according to claim 13, wherein the speed of motion of the extension boom is limited when the head of the crane is within a predetermined distance from the load space.

15. The method according to claim 1, wherein the boom tip control is switched off by at least one of the following ways when the head of the crane is within a given area or reaches a given area by its movement: automatically; by a control function to be generated by a separate control device; and by maintaining a control function for controlling another function for a predetermined time.

16. The method according to claim 15, wherein the boom tip control is automatically switched on again when the head of the crane moves out of a given area.

17. A system for controlling a crane of a working machine by boom tip control, wherein the crane has a head and at least two booms connected to the working machine and to each other in an articulated manner, which booms are moved in relation to the working machine and each other by means of actuators controlled by a control system of the working machine, wherein the system has a control element for controlling the direction and speed of motion of the head of the crane by controlling speeds of the different booms of the crane, wherein the speeds of the different booms of the crane are determined automatically on the basis of at least one of the following factors: positions of the different booms of the crane in relation to an extreme position of their range of motion; a maximum speed of the head of the crane achieved by the crane; and a maximum force achieved by the crane.

18. The system according to claim 17, wherein the control system of the working machine comprises a data processing unit for controlling movements of the crane by programmable software in the data processing unit, and wherein the control element includes software stored in the data processing unit.

* * * * *